United States Patent
Rao et al.

(10) Patent No.: US 11,893,170 B2
(45) Date of Patent: Feb. 6, 2024

(54) METHOD OF POSITIONING LASER POINTER LIGHT SOURCE AND DISPLAY DEVICE

(71) Applicant: SHENZHEN CHINA STAR OPTOELECTRONICS SEMICONDUCTOR DISPLAY TECHNOLOGY CO., LTD., Shenzhen (CN)

(72) Inventors: Yang Rao, Shenzhen (CN); Leli Peng, Shenzhen (CN)

(73) Assignee: SHENZHEN CHINA STAR OPTOELECTRONICS SEMICONDUCTOR DISPLAY TECHNOLOGY CO., LTD., Shenzhen (CN)

(*) Notice: Subject to any disclaimer, the term of this patent is extended or adjusted under 35 U.S.C. 154(b) by 189 days.

(21) Appl. No.: 17/600,578

(22) PCT Filed: May 28, 2021

(86) PCT No.: PCT/CN2021/096951
§ 371 (c)(1),
(2) Date: Sep. 30, 2021

(87) PCT Pub. No.: WO2022/147950
PCT Pub. Date: Jul. 14, 2022

(65) Prior Publication Data
US 2022/0374093 A1   Nov. 24, 2022

(30) Foreign Application Priority Data
Jan. 8, 2021   (CN) .................. 202110025785.8

(51) Int. Cl.
*G06F 3/0354* (2013.01)
*G06F 3/0481* (2022.01)

(52) U.S. Cl.
CPC ........ *G06F 3/03545* (2013.01); *G06F 3/0481* (2013.01)

(58) Field of Classification Search
CPC .. G06F 3/03545; G06F 3/0481; G06F 3/0304; G06F 3/0386
See application file for complete search history.

(56) References Cited

U.S. PATENT DOCUMENTS 5,317,582 A * 5/1994 Siebert ............... G01S 7/483
                                             372/32
5,341,155 A * 8/1994 Elrod .................. G06F 3/0425
                                             345/179

(Continued)

*Primary Examiner* — Bryan Earles
(74) *Attorney, Agent, or Firm* — The Roy Gross Law Firm, LLC; Roy Gross (57) ABSTRACT

A method of positioning a laser pointer light source and a display device are provided. The method of positioning the laser pointer light source includes obtaining first position information and second position information of the laser pointer light source, obtaining first photosensitive information and second photosensitive information, and determining target position information. The present invention determines the target position information according to the first position information, the second position information, the first photosensitive information, and/or the second photosensitive information, which positions the laser pointer light source and distinquishes the laser pointer light source at different positions.

16 Claims, 4 Drawing Sheets

(56) References Cited

U.S. PATENT DOCUMENTS

| | | | | |
|---|---|---|---|---|
| 8,743,092 | B2* | 6/2014 | Kim | G06F 3/0386 |
| | | | | 345/179 |
| 10,129,471 | B2* | 11/2018 | Liu | H04N 23/60 |
| 2005/0110781 | A1* | 5/2005 | Geaghan | G06F 3/042 |
| | | | | 345/180 |
| 2009/0315829 | A1* | 12/2009 | Maison | G06F 3/0386 |
| | | | | 345/158 |
| 2011/0119638 | A1* | 5/2011 | Forutanpour | G06F 3/0386 |
| | | | | 715/863 |
| 2012/0229384 | A1* | 9/2012 | Nakane | G06F 3/03545 |
| | | | | 345/158 |
| 2016/0370883 | A1* | 12/2016 | Narita | G02B 27/20 |

* cited by examiner

METHOD OF POSITIONING LASER POINTER LIGHT SOURCE AND DISPLAY DEVICE

CROSS REFERENCE TO RELATED APPLICATIONS

This application is a National Phase of PCT Patent Application No. PCT/CN2021/096951 having International filing date of May 28, 2021, which claims priority to China Patent Application No. 202110025785.8, filed on Jan. 8, 2021. The contents of the above applciations are incorporated herein by reference in their entirety.

FIELD OF INVENTION

The present application relates to a field of display, and particularly relates to a method of positioning a laser pointer light source and a display device.

BACKGROUND OF INVENTION

In many application scenarios, use of laser pointers and display devices (such as displays) is required to achieve better display effects. In some interactive scenarios, different users use different laser pointers to participate in an interaction on a same display device.

In a process of research and practice of prior art, an inventor of the present application found that a current display device cannot position a light source of a laser pointer, resulting in an inability to distinguish between different laser pointers, which limits an application and development of the interaction between different users using different laser pointers.

Therefore, there is an urgent need for a method of positioning a laser pointer light source and a display device to solve above technical problems.

Technical Problem

An embodiment of the present application provides a method of positioning a laser pointer light source and a display device to solve a problem that display devices (such as displays) cannot position a light source of a laser pointer, resulting in a limited interaction between different users using different laser pointers.

SUMMARY OF INVENTION

In order to solve the above problems, technical solutions provided by the present application are as follows:

An embodiment of the present application provides a method of positioning a laser pointer light source, including: obtaining first position information of a first laser projection position of a laser pointer light source on a display panel and second position information of a second laser projection position of the laser pointer light source on the display panel; obtaining first photosensitive information of the laser pointer light source at the first laser projection position of the display panel and second photosensitive information of the laser pointer light source at the second laser projection position of the display panel; determining target position information of the laser pointer light source according to the first position information, the second position information, the first photosensitive information, and/or the second photosensitive information; and Wherein the first position information, the second position information, the first photosensitive information, and the second photosensitive information are obtained by a light sensor of the display panel.

In one embodiment, the step of obtaining the first position information of the first laser projection position of the laser pointer light source on the display panel and the second position information of the second laser projection position of the laser pointer light source on the display panel includes: obtaining first target receiving point position information of a plurality of first target receiving points of the laser pointer light source at the first laser projection position of the display panel and first target photosensitive values corresponding to the plurality of first target receiving points, and obtaining second target receiving point position information of a plurality of second target receiving points of the laser pointer light source at the second laser projection position of the display panel and second target photosensitive values corresponding to the plurality of second target receiving points, and determining the first position information according to the first target receiving point position information and the first target photosensitive values, and determining the second position information according to the second target receiving point position information and the second target photosensitive values.

In one embodiment, the steps of obtaining the first target receiving point position information of the plurality of first target receiving points of the laser pointer light source at the first laser projection position of the display panel and the first target photosensitive values corresponding to the plurality of first target receiving points, and obtaining the second target receiving point position information of the plurality of second target receiving points of the laser pointer light source at the second laser projection position of the display panel and second target photosensitive values corresponding to the plurality of second target receiving points include: obtaining first receiving point position information of a plurality of first receiving points of the laser pointer light source at the first laser projection position of the display panel and first photosensitive values corresponding to the plurality of first receiving points, and obtaining second receiving point position information of a plurality of second receiving points of the laser pointer light source at the second laser projection position of the display panel and second photosensitive values corresponding to the plurality of second receiving points; determining the first target receiving point position information of at least a first group and a second group and the first target photosensitive values corresponding to the plurality of first target receiving points of the first group and the second group according to the first receiving point position information and the first photosensitive values, and determining the second target receiving point position information of at least a third group and a fourth group and the second target photosensitive values corresponding to the plurality of second target receiving points of the third group and the fourth group according to the second receiving point position information and the second photosensitive values; wherein the plurality of first target receiving points in a same group includes at least two first target receiving points in a same row or in a same column, and the plurality of first target receiving points in a same group are symmetrical about a first axis; the plurality of first target receiving points in the first group are parallel to the plurality of first target receiving points in the second group; the plurality of second target receiving points in a same group includes at least two second target receiving points in a same row or in a same column, and the plurality of second target receiving points in a same group are symmetrical about a second axis; and the plurality of second target receiving points in the third group are parallel to the plurality of second target receiving points in the fourth group.

In one embodiment, the steps of determining the first position information according to the first target receiving point position information and the first target photosensitive values, and determining the second position information according to the second target receiving point position information and the second target photosensitive values include: performing a first weighted calculation and a second weighted calculation to determine the first position information according to the first target receiving point position information and the first target photosensitive values, and performing a third weighted calculation and a fourth weighted calculation to determine the second position information according to the second target receiving point position information and the second target photosensitive values. Wherein a formula for the first weighted calculation is:

$$X1 = \frac{x1 \cdot a1 + x2 \cdot a2 + x3 \cdot a3 + x4 \cdot a4 + \ldots + xn \cdot an}{a1 + a2 + a3 + a4 + \ldots + an};$$

a formula for the second weighted calculation is:

$$Y1 = \frac{y1 \cdot a1 + y2 \cdot a2 + y3 \cdot a3 + y4 \cdot a4 + \ldots + yn \cdot an}{a1 + a2 + a3 + a4 + \ldots + an};$$

a formula for the third weighted calculation is:

$$E2 = \frac{e1 \cdot b1 + e2 \cdot b2 + e3 \cdot b3 + e4 \cdot b4 + \ldots + em \cdot bm}{b1 + b2 + b3 + b4 + \ldots + bm};$$

a formula for the fourth weighted calculation is:

$$F2 = \frac{f1 \cdot b1 + f2 \cdot b2 + f3 \cdot b3 + f4 \cdot b4 + \ldots + fm \cdot bm}{b1 + b2 + b3 + b4 + \ldots + bm};$$

and wherein (X1, Y1) is the first position information, (x1, y1), (x2, y2), (x3, y3), (x4, y4) . . . (xn, yn) are the first target receiving point position information, a1, a2, a3, a4 . . . an are the first target photosensitive values corresponding to the plurality of first target receiving points; (E2, F2) is the second position information, (e1, f1), (e2, f2), (e3, f3), (e4, f4) . . . (em, fm) are the second target receiving point position information, b1, b2, b3, b4 . . . bm are the second target photosensitive values corresponding to the plurality of second target receiving points.

In one embodiment, the step of obtaining the first photosensitive information of the laser pointer light source at the first laser projection position of the display panel and the second photosensitive information of the laser pointer light source at the second laser projection position of the display panel includes: determining the first photosensitive information at least according to the first target receiving point position information of the first group and the second group and an absolute value of a difference between the first target photosensitive values corresponding to the plurality of first target receiving points of the first group and the second group, and determining the second photosensitive information at least according to the second target receiving point position information of the third group and the fourth group and an absolute value of a difference between the second target photosensitive values corresponding to the plurality of second target receiving points of the third group and the fourth group.

In one embodiment, the step of determining the target position information of the laser pointer light source according to the first position information, the second position information, the first photosensitive information, and/or the second photosensitive information includes: determining a plane position information of the laser pointer light source in a first plane according to the first position information and the second position information; determining a target vertical distance information between the laser pointer light source and the first plane according to the plane position information, the first position information, the first photosensitive information, and/or the plane position information, the second position information, and the second photosensitive information; and determining the target position information according to the plane position information and the target vertical distance information; and Wherein the first plane is a plane where the first laser projection position and the second laser projection position are located.

In one embodiment, when the first position information is (X1, Y1) and the second position information is (E2, F2), the plane position information of the laser pointer light source in the first plane is (X1, F2) or (E2, Y1).

In one embodiment, the step of determining the target vertical distance information between the laser pointer light source and the first plane according to the plane position information, the first position information, the first photosensitive information, and/or the plane position information, the second position information, and the second photosensitive information includes: determining a first included angle information according to the first photosensitive information, and/or determining a second included angle information according to the second photosensitive information; determining first vertical distance information between the laser pointer light source and the first plane according to the plane position information, the first position information, and the first included angle information, and/or determining second vertical distance information between the laser pointer light source and the first plane according to the plane position information, the second position information, and the second included angle information; and determining the target vertical distance information according to the first vertical distance information and/or the second vertical distance information; Wherein the first included angle information is an angle value of a first included angle formed by a first optical path and the first plane when light of the laser pointer light source is projected to the first laser projection position; and the second included angle information is an angle value of a second included angle formed by a second optical path and the first plane when light of the laser pointer light source is projected to the second laser projection position.

In one embodiment, the first axis coincides with an orthographic projection of a first optical path in the first plane when light of the laser pointer light source is projected to the first laser projection position, and the second axis coincides with an orthographic projection of a second optical path in the first plane when light of the laser pointer light source is projected to the second laser projection position.

In one embodiment, an absolute value of a numerical process of the first target photosensitive values corresponding to two of the plurality of first target receiving points that are symmetric about the first axis in a same group is less than or equal to a first threshold; and an absolute value of a numerical process of the second target photosensitive values corresponding to two of the plurality of second target receiving points that are symmetric about the second axis in a same group is less than or equal to a second threshold.

An embodiment of the present application further provides a display device, including a first acquisition module, a second acquisition module, and a positioning module. The first acquisition module is configured to obtain first position information of a first laser projection position of a laser pointer light source on a display panel and second position information of a second laser projection position of the laser pointer light source on the display panel. The second acquisition module is configured to obtain first photosensitive information of the laser pointer light source at the first laser projection position of the display panel and second photosensitive information of the laser pointer light source at the second laser projection position of the display panel. The positioning module is configured to determine target position information of the laser pointer light source according to the first position information, the second position information, the first photosensitive information, and/or the second photosensitive information.

In one embodiment, the first acquisition module includes a first acquisition unit and a second acquisition unit. The first acquisition unit is configured to obtain first target receiving point position information of a plurality of first target receiving points of the laser pointer light source at the first laser projection position of the display panel and first target photosensitive values corresponding to the plurality of first target receiving points, and to obtain second target receiving point position information of a plurality of second target receiving points of the laser pointer light source at the second laser projection position of the display panel and second target photosensitive values corresponding to the plurality of second target receiving points. The second acquisition unit is configured to determine the first position information according to the first target receiving point position information and the first target photosensitive values, and to determine the second position information according to the second target receiving point position information and the second target photosensitive values.

In one embodiment, the first acquisition unit includes a first acquisition subunit and a first target acquisition subunit. The first acquisition subunit is configured to obtain first receiving point position information of a plurality of first receiving points of the laser pointer light source at the first laser projection position of the display panel and first photosensitive values corresponding to the plurality of first receiving points, and to obtain second receiving point position information of a plurality of second receiving points of the laser pointer light source at the second laser projection position of the display panel and second photosensitive values corresponding to the plurality of second receiving points. The first target acquisition subunit is configured to determine the first target receiving point position information of at least a first group and a second group and the first target photosensitive values corresponding to the plurality of first target receiving points of the first group and the second group according to the first receiving point position information and the first photosensitive values, and to determine the second target receiving point position information of at least a third group and a fourth group and the second target photosensitive values corresponding to the plurality of second target receiving points of the third group and the fourth group according to the second receiving point position information and the second photosensitive values.

In one embodiment, the second acquisition unit includes a first calculation subunit, the first calculation subunit is configured to perform a first weighted calculation and a second weighted calculation to determine the first position information according to the first target receiving point position information and the first target photosensitive values, and to perform a third weighted calculation and a fourth weighted calculation to determine the second position information according to the second target receiving point position information and the second target photosensitive values. Wherein a formula for the first weighted calculation is:

$$X1 = \frac{x1 \cdot a1 + x2 \cdot a2 + x3 \cdot a3 + x4 \cdot a4 + \ldots + xn \cdot an}{a1 + a2 + a3 + a4 + \ldots + an};$$

a formula for the second weighted calculation is:

$$Y1 = \frac{y1 \cdot a1 + y2 \cdot a2 + y3 \cdot a3 + y4 \cdot a4 + \ldots + yn \cdot an}{a1 + a2 + a3 + a4 + \ldots + an};$$

a formula for the third weighted calculation is:

$$E2 = \frac{e1 \cdot b1 + e2 \cdot b2 + e3 \cdot b3 + e4 \cdot b4 + \ldots + em \cdot bm}{b1 + b2 + b3 + b4 + \ldots + bm};$$

a formula for the fourth weighted calculation is:

$$F2 = \frac{f1 \cdot b1 + f2 \cdot b2 + f3 \cdot b3 + f4 \cdot b4 + \ldots + fm \cdot bm}{b1 + b2 + b3 + b4 + \ldots + bm};$$

and wherein (X1, Y1) is the first position information, (x1, y1), (x2, y2), (x3, y3), (x4, y4) ... (xn, yn) are the first target receiving point position information, a1, a2, a3, a4 ... an are the first target photosensitive values corresponding to the plurality of first target receiving points; and (E2, F2) is the second position information, (e1, f1), (e2, f2), (e3, f3), (e4, f4) ... (em, fm) are the second target receiving point position information, b1, b2, b3, b4 ... bm are the second target photosensitive values corresponding to the plurality of second target receiving points.

In one embodiment, the second acquisition module includes a third acquisition unit. The third acquisition unit is configured to determine the first photosensitive information at least according to the first target receiving point position information of the first group and the second group and an absolute value of a difference between the first target photosensitive values corresponding to the plurality of first target receiving points of the first group and the second group, and to determine the second photosensitive information at least according to the second target receiving point position information of the third group and the fourth group and an absolute value of a difference between the second target photosensitive values corresponding to the plurality of second target receiving points of the third group and the fourth group.

In one embodiment, the third acquisition unit includes a first distance acquisition subunit and a first absolute value acquisition subunit. The first distance acquisition subunit is configured to determine a first distance according to the first target receiving point position information of the first group and the second group, and to determine a second distance according to the second target receiving point position information of the third group and the fourth group. The first absolute value acquisition subunit is configured to determine a first absolute value of a difference between the first target photosensitive values corresponding to the plurality of first target receiving points of the first group and the second group, and to determine a second absolute value of a difference between the second target photosensitive values corresponding to the plurality of second target receiving points of the third group and the fourth group.

In one embodiment, the positioning module includes a first positioning unit, a first calculation unit, and a second positioning unit. The first positioning unit is configured to determine a plane position information of the laser pointer light source in a first plane according to the first position information and the second position information. The first plane is a plane where the first laser projection position and the second laser projection position are located. The first calculation unit is configured to determine a target vertical distance information between the laser pointer light source and the first plane according to the plane position information, the first position information, the first photosensitive information, and/or the plane position information, the second position information, and the second photosensitive information. The second positioning unit is configured to determine the target position information according to the plane position information and the target vertical distance information.

In one embodiment, the first calculation unit includes a second distance acquisition subunit, a second calculation subunit, and a third calculation subunit. The second distance acquisition subunit is configured to obtain a third distance according to the plane position information and the first position information, and/or obtain a fourth distance according to the plane position information and the second position information. The second calculation subunit is configured to obtain first vertical distance information according to the third distance and a first included angle information and/or to obtain second vertical distance information according to the fourth distance and a second included angle information. The third calculation subunit is configured to determine the target vertical distance information according to the first vertical distance information and/or the second vertical distance information.

In one embodiment, the display device further includes a light sensor, a thin film transistor array configured to read data of the light sensor, and a reading circuit.

In one embodiment, the display device further includes a memory, wherein the memory stores a plurality of instructions.

The present invention determines target position information of a laser pointer light source according to first position information, second position information, first photosensitive information, and/or second photosensitive information. In this way, the laser pointer light source is positioned, and laser pointer light sources at different positions are distinguished so that users can interact with different laser pointers.

DETAILED DESCRIPTION OF PREFERRED EMBODIMENTS

The present application provides a method of positioning a laser pointer light source and a display device. In order to make the purpose, technical solutions, and effects of the present application clear, the following further describes the present application in detail with reference to accompanying drawings and examples. It is understood that the specific embodiments described herein are only used to explain the present application, and are not used to limit the present application.

Please refer to FIG. 1 to FIG. 4, the method of positioning the laser pointer light source includes: S100, obtaining first position information of a first laser projection position 102 of a laser pointer light source on a display panel and second position information of a second laser projection position 103 of the laser pointer light source on the display panel.

In this embodiment, the first position information can be first coordinate information of the first laser projection position 102, and the second position information can be second coordinate information of the second laser projection position 103.

The first coordinate information and the second coordinate information are coordinates of the first laser projection position 102 and the second laser projection position 103 in a first plane, respectively.

The first plane 101 can be a plane where the first laser projection position 102 and the second laser projection position 103 are located.

The first coordinate information can be expressed as (X1, Y1), and the second coordinate information can be expressed as (E2, F2).

Wherein X1 and E2 are coordinates of the first laser projection position 102 and the second laser projection position 103 on a first coordinate axis, respectively, and Y1 and F2 are coordinates of the first laser projection position 102 and the second laser projection position 103 on a second coordinate axis, respectively. The first coordinate axis is perpendicular to the second coordinate axis.

Figure 1:
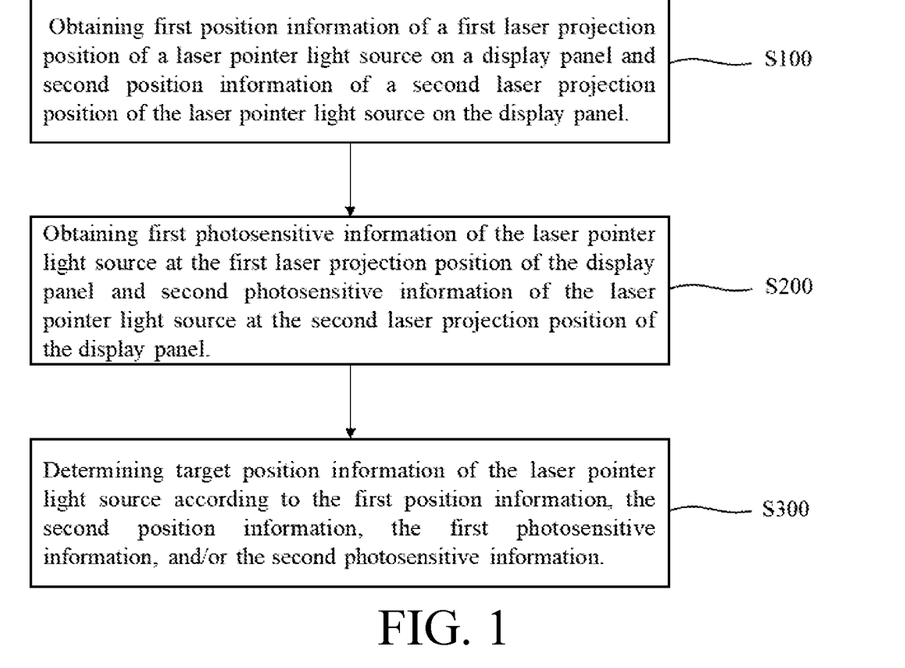
FIG. 1 is a flowchart of a method of positioning a laser pointer light source of the present invention.

In this embodiment, step S100 may include:

S110, obtaining first target receiving point position information of a plurality of first target receiving points of the laser pointer light source at the first laser projection position 102 of the display panel and first target photosensitive values corresponding to the plurality of first target receiving points, and obtaining second target receiving point position information of a plurality of second target receiving points of the laser pointer light source at the second laser projection position 103 of the display panel and second target photosensitive values corresponding to the plurality of second target receiving points.

In this embodiment, step S110 may include:

S111, obtaining first receiving point position information of a plurality of first receiving points of the laser pointer light source at the first laser projection position 102 of the display panel and first photosensitive values corresponding to the plurality of first receiving points, and obtaining second receiving point position information of a plurality of second receiving points of the laser pointer light source at the second laser projection position 103 of the display panel and second photosensitive values corresponding to the plurality of second receiving points.

Figure 2:
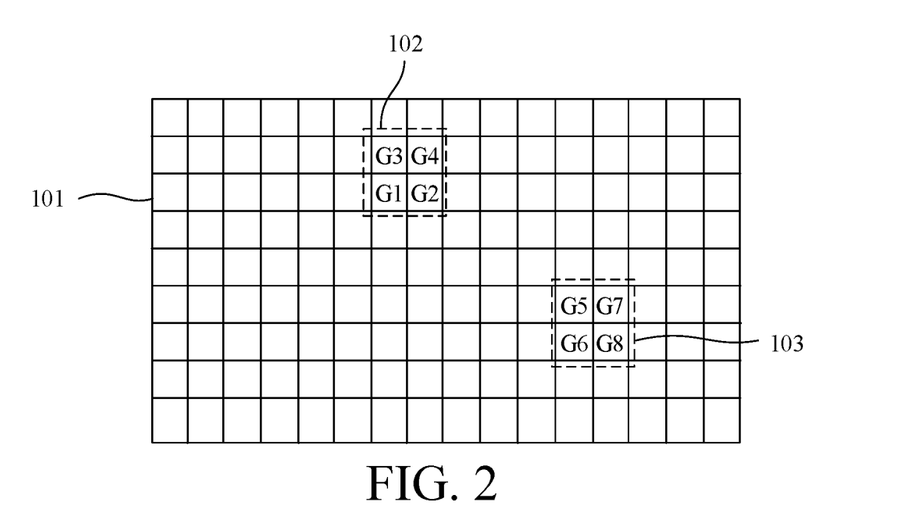
FIG. 2 is a first schematic diagram of a method of positioning a laser pointer light source of the present invention.

In this embodiment, the first receiving point position information and the second receiving point position information may be position information of light sensor in the display device in the first plane 101.

When light emitted by the laser pointer light source is projected to the first laser projection position 102, the light sensors of the plurality of first receiving points located at the first laser projection position 102 receive light signals, and each of the first receiving points can obtain a corresponding first photosensitive value. Similarly, when the light emitted by the laser pointer light source is projected to the second laser projection position 103, the light sensors of the plurality of second receiving points located at the second laser projection position 103 receive the light signals, and each of the second receiving points can obtain a corresponding second photosensitive value.

S112, determining the first target receiving point position information of at least a first group and a second group and the first target photosensitive values corresponding to the plurality of first target receiving points of the first group and the second group according to the first receiving point position information and the first photosensitive values, and determining the second target receiving point position information of at least a third group and a fourth group and the second target photosensitive values corresponding to the plurality of second target receiving points of the third group and the fourth group according to the second receiving point position information and the second photosensitive values.

Wherein the plurality of first target receiving points in a same group includes at least two first target receiving points in a same row or in a same column, and the plurality of first target receiving points in the same group are symmetrical about a first axis.

The plurality of first target receiving points in the first group are parallel to the plurality of first target receiving points in the second group.

The plurality of second target receiving points in the a group includes at least two second target receiving points in a same row or in a same column, and the plurality of second target receiving points in the same group are symmetrical about a second axis.

The plurality of second target receiving points in the third group are parallel to the plurality of second target receiving points in the fourth group.

In this embodiment, the plurality of first target receiving points in a same group includes at least two first target receiving points in a same row or in a same column, which means that coordinates of the first coordinate axis or coordinates of the second coordinate axis of the plurality of first target receiving points in the same group are same. Similarly, the plurality of second target receiving points in a same group includes at least two second target receiving points in a same row or in a same column, which means that the coordinates of the first coordinate axis or the coordinates of the second coordinate axis of the plurality of second target receiving points in the same group are same.

In this embodiment, the first axis coincides with an orthographic projection of a first optical path in the first plane 101 when light of the laser pointer light source is projected to the first laser projection position 102. The second axis coincides with an orthographic projection of a second optical path in the first plane 101 when the light of the laser pointer light source is projected to the second laser projection position 103.

In this embodiment, the first axis is parallel to the first coordinate axis or the second coordinate axis, and the second axis is perpendicular or parallel to the first axis.

In this embodiment, an absolute value of a numerical process of the first target photosensitive values corresponding to two of the plurality of first target receiving points that are symmetric about the first axis in a same group is less than or equal to a first threshold, and the first threshold can be zero. Similarly, an absolute value of a numerical process of the second target photosensitive values corresponding to two of the plurality of second target receiving points that are symmetric about the second axis in a same group is less than or equal to a second threshold, and the second threshold can be zero.

In this embodiment, the first target receiving points in the first group and the first target receiving points in the second group may be symmetrical about a third axis, and the first axis is perpendicular to the third axis. The second target receiving points in the third group and the second target receiving points in the fourth group may be symmetrical about a fourth axis, and the second axis is perpendicular to the fourth axis.

Please refer to FIG. 2. For example, when the first target receiving points in the first group are respectively G1 and G2, G1 and G2 are arranged in a same row. When G1 and G2 are symmetrically arranged with respect to the first axis, and when the first axis is parallel to the second coordinate axis, the first target receiving point position information corresponding to G1 and G2 can be (x1, y1) and (x2, y2), and the first target photosensitive values corresponding to G1 and G2 can be a1 and a2, where y1=y2, and a1=a2.

When the first target receiving points in the second group are G3 and G4 respectively, G3 and G4 are arranged in a same row. When G3 and G4 are symmetrically arranged with respect to the first axis, and when the first axis is parallel to the second coordinate axis, the first target receiving point position information corresponding to G3 and G4 can be (x3, y3) and (x4, y4). The first target photosensitive values corresponding to G3 and G4 can be a3 and a4, where y3=y4, and a3=a4.

In this situation, G1 and G3 can be symmetrical about the third axis, and G2 and G4 can be symmetrical about the third axis, that is, x1=x3, and x2=x4.

When the second target receiving points in the third group are respectively G5 and G6, G5 and G6 are arranged in a same column. When G5 and G6 are symmetrically arranged about the second axis, and when the second axis is parallel to the first coordinate axis, the second target receiving point position information corresponding to G5 and G6 can be (e1, f1) and (e2, f2). The second target photosensitive values corresponding to G5 and G6 can be b1 and b2, where e1=e2, and b1=b2.

When the second target receiving points in the fourth group are respectively G7 and G8, G7 and G8 are arranged in a same column. When G7 and G8 are arranged symmetrically about the second axis, and when the second axis is parallel to the first coordinate axis, the second target receiving point position information corresponding to G7 and G8 can be (e3, f3) and (e4, f4). The second target sensitivity values corresponding to G7 and G8 can be b3 and b4, where e3=e4, and b3=b4.

In this situation, G5 and G7 can be symmetrical about the fourth axis, and G6 and G8 can be symmetrical about the fourth axis, that is, f1=f3, and f2=f4.

In this embodiment, when a device for positioning the laser pointer light source is a display device, the first laser projection position 102 and the second laser projection position 103 are located on a display panel of the display device. The first target receiving points and the second target receiving points can be light sensors arranged between pixels. The first target receiving points G1, G2, G3, and G4 may be the light sensors arranged between adjacent pixels. For example, G1 and G2 are distributed in a same row, and are light sensors on both sides of the pixel in 10th row and 12th column, and G3 and G4 are also distributed in same row, and are light sensors on both sides of the pixels in 9th row and 12th column. Similarly, the second target receiving points G5, G6, G7, and G8 can be light sensors arranged between adjacent pixels. For example, G5 and G6 are distributed in a same column, and are light sensors on both sides of the pixel in 20th row and 18th column, and G7 and G8 are distributed in a same column, and are light sensors on both sides of the pixel in 20th row and 19th column.

S120, determining the first position information according to the first target receiving point position information and the first target photosensitive values, and determining the second position information according to the second target receiving point position information and the second target photosensitive values.

In this embodiment, step S120 may include:

S121, performing a first weighted calculation and a second weighted calculation to determine the first position information according to the first target receiving point position information and the first target photosensitive values, and performing a third weighted calculation and a fourth weighted calculation to determine the second position information according to the second target receiving point position information and the second target photosensitive values.

Wherein a formula for the first weighted calculation is:

$$X1 = \frac{x1 \cdot a1 + x2 \cdot a2 + x3 \cdot a3 + x4 \cdot a4 + \ldots + xn \cdot an}{a1 + a2 + a3 + a4 + \ldots + an};$$

a formula for the second weighted calculation is:

$$Y1 = \frac{y1 \cdot a1 + y2 \cdot a2 + y3 \cdot a3 + y4 \cdot a4 + \ldots + yn \cdot an}{a1 + a2 + a3 + a4 + \ldots + an};$$

a formula for the third weighted calculation is:

$$E2 = \frac{e1 \cdot b1 + e2 \cdot b2 + e3 \cdot b3 + e4 \cdot b4 + \ldots + em \cdot bm}{b1 + b2 + b3 + b4 + \ldots + bm};$$

and a formula for the fourth weighted calculation is:

$$F2 = \frac{f1 \cdot b1 + f2 \cdot b2 + f3 \cdot b3 + f4 \cdot b4 + \ldots + fm \cdot bm}{b1 + b2 + b3 + b4 + \ldots + bm};$$

and wherein (X1, Y1) is the first position information, (x1, y1), (x2, y2), (x3, y3), (x4, y4) . . . (xn, yn) are the first target receiving point position information, a1, a2, a3, a4 . . . an are the first target photosensitive values corresponding to the plurality of first target receiving points; and (E2, F2) is the second position information, (e1, f1), (e2, f2), (e3, f3), (e4, f4) . . . (em, fm) are the second target receiving point position information, b1, b2, b3, b4 . . . bm are the second target photosensitive values corresponding to the plurality of second target receiving points.

In this embodiment, when the first target receiving points at the first laser projection position 102 is G1, G2, G3, G4 as described above, $$X1 = \frac{x1 + x2}{2}, \text{ and } Y1 = \frac{y1 + y2}{2}.$$

When the second target receiving points at the second laser projection position 103 is G5, G6, G7, G8 as described above, $$E2 = \frac{e1 + e2}{2}, \text{ and } F2 = \frac{f1 + f2}{2}.$$

S200, obtaining first photosensitive information of the first laser projection position 102 and second photosensitive information of the second laser projection position 103.

In this embodiment, step S200 may include: S210, determining the first photosensitive information at least according to the first target receiving point position information of the first group and the second group and an absolute value of a difference between the first target photosensitive values corresponding to the plurality of first target receiving points of the first group and the second group, and determining the second photosensitive information at least according to the second target receiving point position information of the third group and the fourth group and an absolute value of a difference between the second target photosensitive values corresponding to the plurality of second target receiving points of the third group and the fourth group.

In this embodiment, step S210 may include: S211, determining a first distance according to the first target receiving point position information of the first group and the second group, and determining a second distance according to the second target receiving point position information of the third group and the fourth group.

In this embodiment, when the first target receiving points in the first group and the first target receiving points in the second group are symmetrically arranged about the third axis, and when the first axis is parallel to the first coordinate axis, the first distance can be an absolute value of a coordinate difference on the first coordinate axis between the first target receiving point in the first group and the first target receiving point in the second group. When the first axis is parallel to the second coordinate axis, the first distance can be an absolute value of a coordinate difference on the second coordinate axis between the first target receiving point in the first group and the first target receiving point in the second group.

Similarly, when the second target receiving points in the third group and the second target receiving points in the fourth group are symmetrically arranged about the fourth axis, and when the second axis is parallel to the second coordinate axis, the second distance can be an absolute value of a coordinate difference on the first coordinate axis between the second target receiving point in the third group and the second target receiving point in the fourth group. When the second axis is parallel to the second coordinate axis, the second distance may be an absolute value of a coordinate difference on the second coordinate axis between the second target receiving point in the third group and the second target receiving point in the fourth group.

For example, when the first target receiving points in the first group are G1 (x1, y1) and G2 (x2, y2) as described above, and the first target receiving points in the second group are G3 (x3, y3) and G4 (x4, y4) as described above, and when x1=x3, and x2=x4, the first distance d1=|y3−y1| or the first distance d1=|y4−y2|.

When the second target receiving points in the third group are G5 (e1, f1) and G6 (e2, f2) as described above, and the second target receiving points in the fourth group are G7 (e3, f3) and G8 (e4, f4) as described above, and when f1=f3 and f2=f4, the second distance d2=|e3−e1| or the second distance d1=|e4−e2|.

S212, determine a first absolute value V1 of a difference of the first target photosensitive values corresponding to the first target receiving points in the first group and the second group according to the first target photosensitive values corresponding to the first target receiving points in the first group and the second group, and determine a second absolute value V2 of a difference of the second target photosensitive values corresponding to the second target receiving points in the third group and the fourth group according to the second target photosensitive values corresponding to the second target receiving points in the third group and the fourth group.

The first photosensitive information includes the first distance and the first absolute value, and the second photosensitive information includes the second distance and the second absolute value.

S300, determining target position information of the laser pointer light source according to the first position information, the second position information, the first photosensitive information, and/or the second photosensitive information.

In this embodiment, step S300 may include: S310, determining a plane position information of the laser pointer light source in the first plane 101 according to the first position information and the second position information.

In this embodiment, the plane position information of the laser pointer light source in the first plane 101 can be represented by first plane coordinates. When the first axis is parallel to the second coordinate axis and the second axis is parallel to the first coordinate axis, the first plane coordinates can be expressed as (X1, F2). Similarly, when the first axis is parallel to the first coordinate axis and the second axis is parallel to the second coordinate axis, the first plane coordinates can be expressed as (E2, Y1).

S320, determining a target vertical distance information between the laser pointer light source and the first plane 101 according to the plane position information, the first position information, the first photosensitive information, and/or the plane position information, the second position information, and the second photosensitive information.

In this embodiment, step S320 may include:

S321, determining a first included angle information according to the first photosensitive information, and/or determining a second included angle information according to the second photosensitive information.

Wherein the first included angle information is an angle value of a first included angle formed by the first optical path and the first plane 101 when the light of the laser pointer light source is projected to the first laser projection position.

The second included angle information is an angle value of a second included angle formed by the second optical path and the first plane 101 when the light of the laser pointer light source is projected to the second laser projection position.

In this embodiment, step S321 may include: S321a, obtaining the first included angle information according to the first distance and the first absolute value, and obtaining the first included angle information according to the second distance and the second absolute value.

Figure 3:
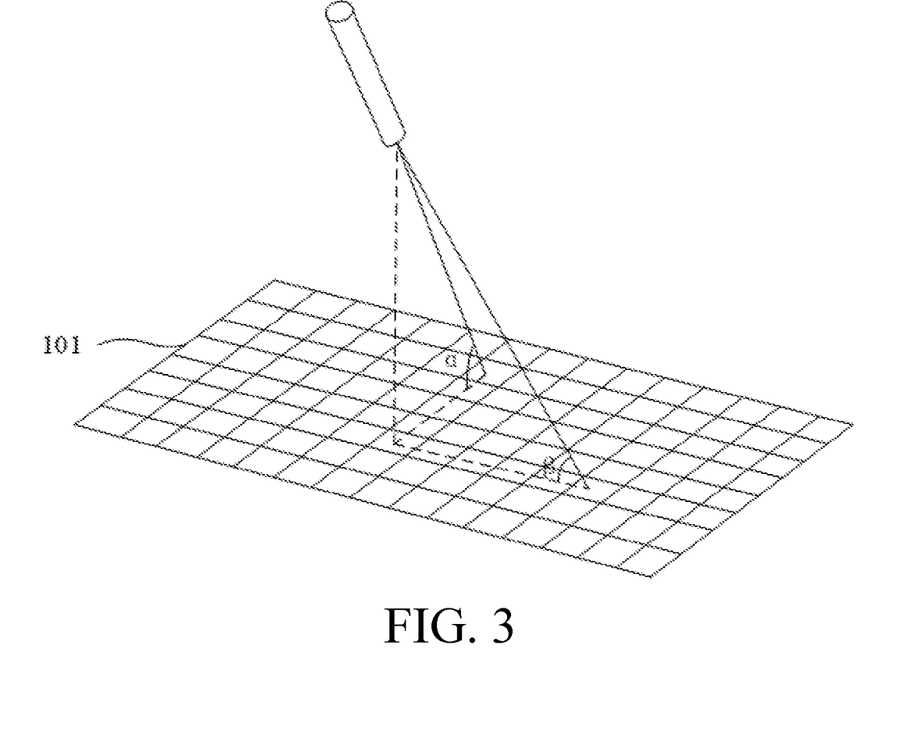
FIG. 3 is a second schematic diagram of a method of positioning a laser pointer light source of the present invention.
Figure 4:
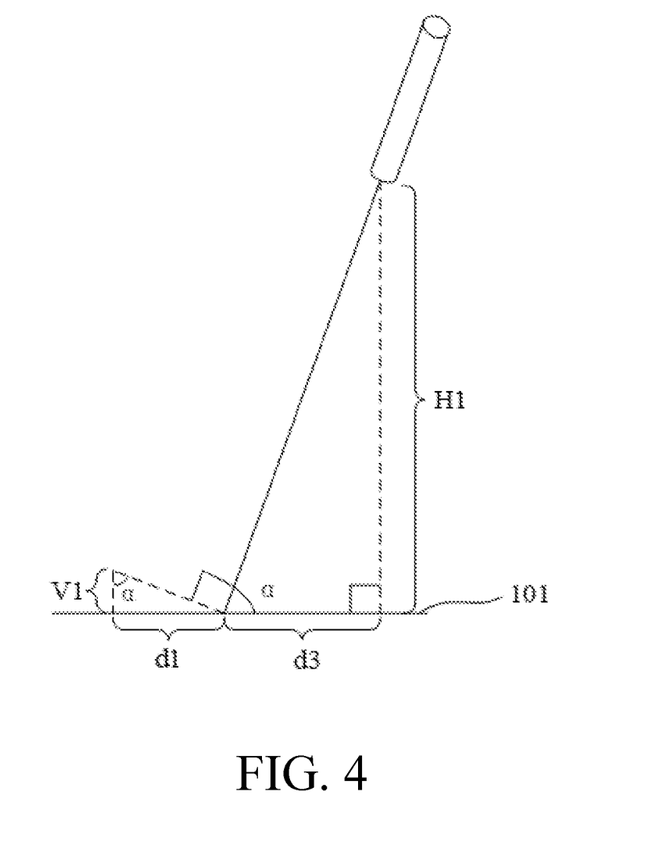
FIG. 4 is a third schematic diagram of a method of positioning a laser pointer light source of the present invention.

Please refer to FIG. 3 and FIG. 4. For example: when the first target receiving points in the first group are G1 (x1, y1) and G2 (x2, y2) as described above, and when the first target receiving points in the second group are G3 (x3, y3) and G4 (x4, y4) as described above, the first distance d1=|y3−y1| or d1=|y4−y2|, and the first absolute value V1=|a3−a1| or V1=|a4−a2|. In this situation, it can be known from a simple geometric relationship that the angle value of the first included angle is α=arctan(d1/V1).

When the second target receiving points in the third group are G5 (e1, f1) and G6 (e2, f2) as described above, and when the second target receiving points in the fourth group are G7 (e3, f3) and G8 (e4, f4) as described above, the second distance d2=|e3−e1| or d2=|e4−e2|, and the second absolute value is V2=|b3−b1| or V2=|b4−b2|. In this situation, it can be known from the simple geometric relationship that the angle value β of the second included angle is β=arctan(d2/V2).

When G1, G2, G3, and G4 are the light sensors between adjacent pixels, the first distance may be a pixel distance. Similarly, when G5, G6, G7, and G8 are the light sensors between adjacent pixels, the second distance may also be a pixel distance.

S322, determining first vertical distance information between the laser pointer light source and the first plane 101 according to the plane position information, the first position information, and the first included angle information, and/or determining second vertical distance information between the laser pointer light source and the first plane 101 according to the plane position information, the second position information, and the second included angle information.

In this embodiment, step S322 may include: S322a, obtaining a third distance according to the plane position information and the first position information, and/or obtaining a fourth distance according to the plane position information and the second position information.

The third distance is a length of the orthographic projection of the first optical path in the first plane 101, and the fourth distance is a length of the orthographic projection of the second optical path in the first plane 101.

For example, when the plane position information is (X1, F2) and the first position information is (X1, Y1), the third distance is d3=|Y1−F2|, and when the plane position information is (E2, Y1) and the first position information is (X1, Y1), the third distance d3=|X1−E2|.

When the plane position information is (X1, F2) and the second position information is (E2, F2), the fourth distance is d4=|E2−X1|. When the plane position information is (E2, Y1) and the second position information is (E2, F2), the fourth distance d4=|Y1−F2|.

S322b, obtaining first vertical distance information according to the third distance and the first included angle information and/or obtaining second vertical distance information according to the fourth distance and the second included angle information.

For example, according to the simple geometric relationship, the first vertical distance information H1=d3*tan α. When the angle value of the first included angle α=arctan (d1/V1), H1=d3*d1/V1, that is, H1=|Y1−F2|*d1/V1 or H1=|X1−E2|*d1/V1.

Similarly, according to the simple geometric relationship, it can be known that the second vertical distance information H2=d4*tan β. When the angle value of the second included angle β=arctan(d2/V2), H2=d4*d2/V2, that is, H2=|E2−X1|*d2/V2 or H2=|Y1−F2|*d2/V2.

S323, determining the target vertical distance information according to the first vertical distance information and/or the second vertical distance information.

In this embodiment, step S323 may include: S323a, using the first vertical distance information as the target vertical distance information.

In this situation, the target vertical distance information H=H1.

Alternatively, in this embodiment, step S323 may include: S323b, using the second vertical distance information as the target vertical distance information.

In this situation, the target vertical distance information H=H2.

Alternatively, in this embodiment, step S323 may include:

S323c, using an average value of the first vertical distance information and the second vertical distance information as the target vertical distance information.

In this situation, the target vertical distance information H=(H1+H2)/2.

S330, determining the target position information according to the plane position information and the target vertical distance information.

In this embodiment, the target position information can be spatial coordinates of the laser pointer light source relative to the plane where the first laser projection position 102 and the second laser projection position 103 are located. In this situation, the target position information can be expressed as (P, Q, Z). Wherein P is a coordinate of the laser pointer light source on the first coordinate axis, Q is a coordinate of the laser pointer light source on the second coordinate axis, and Z is a coordinate of the laser pointer light source on the third coordinate axis. The third coordinate axis is a coordinate axis perpendicular to the plane where the first coordinate axis and the second coordinate axis are located.

When the plane position information is (X1, F2) or (E2, Y1), and the target vertical distance information is H, the target position information can be expressed as (X1, F2, H) or (E2, Y1, H).

Please refer to FIG. 1 to FIG. 6. The present application further provides a display device 100, which includes a first acquisition module 10, a second acquisition module 20, and a positioning module 30.

Figure 5:
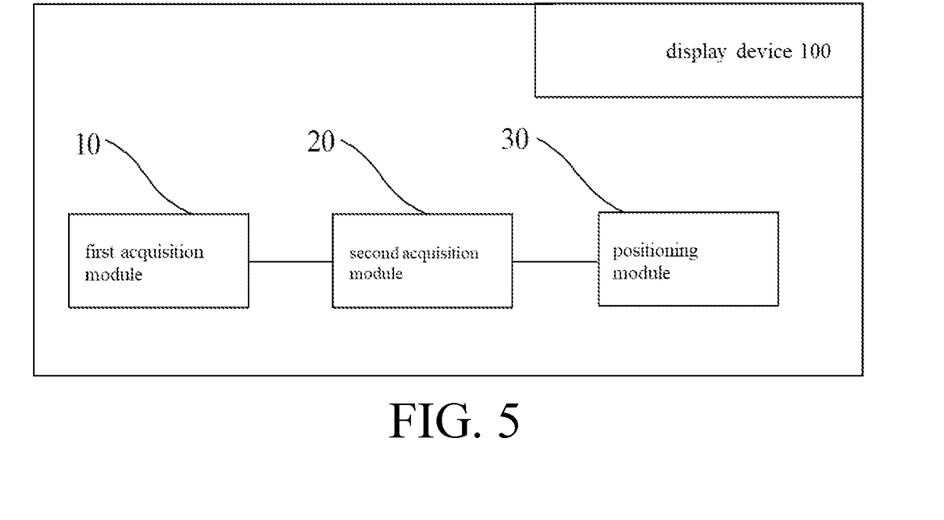
FIG. 5 is a schematic diagram of a first structure of a display device of the present invention.
Figure 6:
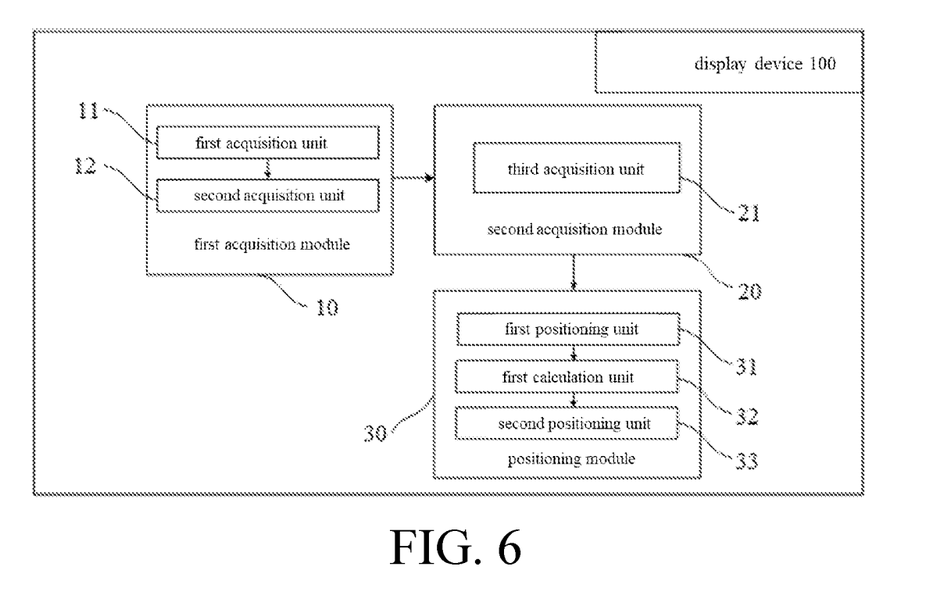
FIG. 6 is a schematic diagram of a second structure of a display device of the present invention.

The first acquisition module 10 is configured to obtain first position information of a first laser projection position 102 of a laser pointer light source on a display panel and second position information of a second laser projection position 103 of the laser pointer light source on the display panel.

In this embodiment, the first acquisition module 10 includes a first acquisition unit 11 and a second acquisition unit 12.

The first acquisition unit 11 is configured to obtain first target receiving point position information of a plurality of first target receiving points of the laser pointer light source at the first laser projection position 102 of the display panel and first target photosensitive values corresponding to the plurality of first target receiving points, and to obtain second target receiving point position information of a plurality of second target receiving points of the laser pointer light source at the second laser projection position 103 of the display panel and second target photosensitive values corresponding to the plurality of second target receiving points.

In this embodiment, the first acquisition unit 11 includes a first acquisition subunit and a first target acquisition subunit.

The first acquisition subunit is configured to obtain first receiving point position information of a plurality of first receiving points of the laser pointer light source at the first laser projection position 102 of the display panel and first photosensitive values corresponding to the plurality of first receiving points, and to obtain second receiving point position information of a plurality of second receiving points of the laser pointer light source at the second laser projection position 103 of the display panel and second photosensitive values corresponding to the plurality of second receiving points.

The first target acquisition subunit is configured to determine the first target receiving point position information of at least a first group and a second group and the first target photosensitive values corresponding to the plurality of first target receiving points of the first group and the second group according to the first receiving point position information and the first photosensitive values, and to determine the second target receiving point position information of at least a third group and a fourth group and the second target photosensitive values corresponding to the plurality of second target receiving points of the third group and the fourth group according to the second receiving point position information and the second photosensitive values.

The second acquisition unit 12 is configured to determine the first position information according to the first target receiving point position information and the first target photosensitive values, and to determine the second position information according to the second target receiving point position information and the second target photosensitive values.

The second acquisition unit 12 includes a first calculation subunit.

The first calculation subunit is configured to perform a first weighted calculation and a second weighted calculation to determine the first position information according to the first target receiving point position information and the first target photosensitive values, and to perform a third weighted calculation and a fourth weighted calculation to determine the second position information according to the second target receiving point position information and the second target photosensitive values.

Wherein a formula for the first weighted calculation is:

$$X1 = \frac{x1 \cdot a1 + x2 \cdot a2 + x3 \cdot a3 + x4 \cdot a4 + \ldots + xn \cdot an}{a1 + a2 + a3 + a4 + \ldots + an};$$

a formula for the second weighted calculation is:

$$Y1 = \frac{y1 \cdot a1 + y2 \cdot a2 + y3 \cdot a3 + y4 \cdot a4 + \ldots + yn \cdot an}{a1 + a2 + a3 + a4 + \ldots + an};$$

a formula for the third weighted calculation is:

$$E2 = \frac{e1 \cdot b1 + e2 \cdot b2 + e3 \cdot b3 + e4 \cdot b4 + \ldots + em \cdot bm}{b1 + b2 + b3 + b4 + \ldots + bm};$$

and
a formula for the fourth weighted calculation is:

$$F2 = \frac{f1 \cdot b1 + f2 \cdot b2 + f3 \cdot b3 + f4 \cdot b4 + \ldots + fm \cdot bm}{b1 + b2 + b3 + b4 + \ldots + bm}.$$

Wherein (X1, Y1) is the first position information, (x1, y1), (x2, y2), (x3, y3), (x4, y4) . . . (xn, yn) are the first target receiving point position information, a1, a2, a3, a4 . . . an are the first target photosensitive values corresponding to the plurality of first target receiving points.

(E2, F2) is the second position information, (e1, f1), (e2, f2), (e3, f3), (e4, f4) . . . (em, fm) are the second target receiving point position information, b1, b2, b3, b4 . . . bm are the second target photosensitive values corresponding to the plurality of second target receiving points.

The second acquisition module 20 is configured to obtain first photosensitive information of the first laser projection position 102 and second photosensitive information of the second laser projection position 103.

In this embodiment, the second acquisition module 20 includes a third acquisition unit 21.

The third acquisition unit is configured to determine the first photosensitive information at least according to the first target receiving point position information of the first group and the second group and an absolute value of a difference between the first target photosensitive values corresponding to the plurality of first target receiving points of the first group and the second group, and to determine the second photosensitive information at least according to the second target receiving point position information of the third group and the fourth group and an absolute value of a difference between the second target photosensitive values corresponding to the plurality of second target receiving points of the third group and the fourth group.

In this embodiment, the third acquisition unit 21 includes a first distance acquisition subunit and a first absolute value acquisition subunit.

The first distance acquisition subunit is configured to determine a first distance according to the first target receiving point position information of the first group and the second group, and to determine a second distance according to the second target receiving point position information of the third group and the fourth group.

The first absolute value acquisition subunit is configured to determine a first absolute value V1 of a difference between the first target photosensitive values corresponding to the plurality of first target receiving points of the first group and the second group according to the first target photosensitive value corresponding to the plurality of first target receiving points of the first group and the second group, and to determine a second absolute value V2 of a difference between the second target photosensitive values corresponding to the plurality of second target receiving points of the third group and the fourth group according to the second photosensitive value corresponding to the plurality of second target receiving points of the third group and the fourth group.

The first photosensitive information includes the first distance and the first absolute value, and the second photosensitive information includes the second distance and the second absolute value.

The positioning module 30 is configured to determine the target position information of the laser pointer light source according to the first position information, the second position information, the first photosensitive information, and/or the second photosensitive information.

In this embodiment, the positioning module 30 includes a first positioning unit 31, a first calculation unit 32, and a second positioning unit 33.

The first positioning unit 31 is configured to determine plane position information of the laser pointer light source in a first plane 101 according to the first position information and the second position information.

The first plane 101 is a plane where the first laser projection position 102 and the second laser projection position 103 are located.

The first calculation unit 32 is configured to determine a target vertical distance information between the laser pointer light source and the first plane 101 according to the plane position information, the first position information, the first photosensitive information, and/or the plane position information, the second position information, and the second photosensitive information.

In this embodiment, the first calculation unit includes a second distance acquisition subunit, a second calculation subunit, and a third calculation subunit.

The second distance acquisition subunit is configured to obtain a third distance according to the plane position information and the first position information, and/or obtain a fourth distance according to the plane position information and the second position information.

The second calculation subunit is configured to obtain the first vertical distance information according to the third distance and first included angle information and/or to obtain the second vertical distance information according to the fourth distance and second included angle information.

The third calculation subunit is configured to determine the target vertical distance information according to the first vertical distance information and/or the second vertical distance information.

The third distance is a length of an orthographic projection of a first optical path in the first plane 101, and the fourth distance is a length of an orthographic projection of a second optical path in the first plane 101.

In this embodiment, the second positioning unit 33 is configured to determine the target position information according to the plane position information and the vertical distance information.

In this embodiment, the display device includes a light sensor, a thin film transistor array for reading data of the light sensor, and a reading circuit.

The light sensor, the thin film transistor array, and the reading circuit are used for the first acquisition module 10 and the second acquisition module 20 to obtain the first position information, the second position information, the first photosensitive information, and the second photosensitive information.

The display device 100 further includes a memory, and the memory stores a plurality of instructions. The instructions are available to be loaded by a processor to execute the steps in the method of positioning the laser pointer light source as described above.

As described above, the present invention provides a method of positioning a laser pointer light source and a display device. The method of positioning the laser pointer light source includes: obtaining the first position information of the first laser projection position of the laser pointer light source on the display panel and the second position information of the second laser projection position of the same laser pointer light source on the display panel; obtaining the first photosensitive information of the laser pointer light source at the first laser projection position of the display panel and the second photosensitive information of the same laser pointer light source at the second laser projection position of the display panel; and determining the target position information of the laser pointer light source according to the first position information, the second position information, the first photosensitive information, and/or the second photosensitive information. The present invention determines the target position information of the laser pointer light source according to the first position information, the second position information, the first photosensitive information, and/or the second photosensitive information. In this way, the laser pointer light source is positioned, and the laser pointer light source at different positions is distinguished so that users can interact through different laser pointers.

It can be understood that for those of ordinary skill in the art, equivalent substitutions or modifications can be made according to the technical solution and inventive concept of the present application, and all these modifications or substitutions should fall within the protection scope of the claims of the present application.

What is claimed is:

1. A method of positioning a laser pointer light source, comprising:
    obtaining first position information of a first laser projection position of a laser pointer light source on a display panel and second position information of a second laser projection position of the laser pointer light source on the display panel;
    obtaining first photosensitive information of the laser pointer light source at the first laser projection position of the display panel and second photosensitive information of the laser pointer light source at the second laser projection position of the display panel; and
    determining target position information of the laser pointer light source according to the first position information, the second position information, the first photosensitive information, and/or the second photosensitive information;
    wherein the first position information, the second position information, the first photosensitive information, and the second photosensitive information are obtained by a light sensor of the display panel;
    wherein the obtaining of the first position information of the first laser projection position of the laser pointer light source on the display panel and the second position information of the second laser projection position of the laser pointer light source on the display panel comprises:
        obtaining first target receiving point position information of a plurality of first target receiving points of the laser pointer light source at the first laser projection position of the display panel and first target photosensitive values respectively corresponding to the plurality of first target receiving points, and obtaining second target receiving point position information of a plurality of second target receiving points of the laser pointer light source at the second laser projection position of the display panel and second target photosensitive values respectively corresponding to the plurality of second target receiving points, wherein the first target receiving points and the second target receiving points are light sensors respectively arranged between pixels of the display panel, the first target receiving points are arranged between adjacent pixels of the display panel, and the second target receiving points are arranged between adjacent pixels of the display panel; and
    determining the first position information according to the first target receiving point position information and the first target photosensitive values, and determining the second position information according to the second target receiving point position information and the second target photosensitive values,
    wherein the determining of the first position information according to the first target receiving point position information and the first target photosensitive value, and the determining of the second position information according to the second target receiving point position information and the second target photosensitive values comprise:
    performing a first weighted calculation and a second weighted calculation to determine the first position information according to the first target receiving point position information and the first target photosensitive values, and performing a third weighted calculation and a fourth weighted calculation to determine the second position information according to the second target receiving point position information and the second target photosensitive values;
    wherein a formula for the first weighted calculation is:

$$X1 = \frac{x1 \cdot a1 + x2 \cdot a2 + x3 \cdot a3 + x4 \cdot a4 + \ldots + xn \cdot an}{a1 + a2 + a3 + a4 + \ldots + an};$$

a formula for the second weighted calculation is:

$$Y1 = \frac{y1 \cdot a1 + y2 \cdot a2 + y3 \cdot a3 + y4 \cdot a4 + \ldots + yn \cdot an}{a1 + a2 + a3 + a4 + \ldots + an};$$

a formula for the third weighted calculation is:

$$E2 = \frac{e1 \cdot b1 + e2 \cdot b2 + e3 \cdot b3 + e4 \cdot b4 + \ldots + em \cdot bm}{b1 + b2 + b3 + b4 + \ldots + bm};$$

and
a formula for the fourth weighted calculation is:

$$F2 = \frac{f1 \cdot b1 + f2 \cdot b2 + f3 \cdot b3 + f4 \cdot b4 + \ldots + fm \cdot bm}{b1 + b2 + b3 + b4 + \ldots + bm},$$

where (X1, Y1) is the first position information, (x1, 1), (x2, y2), (x3, y3), (x4, y4) . . . (xn, yn) are the first target receiving point position information, a1, a2, a3, a4 . . . an are the first target photosensitive values corresponding to the plurality of first target receiving points; and (E2, F2) is the second position information, (e1, f1), (e2, f2), (e3, f3), (e4, f4) . . . (em, fm) are the second target receiving point position information, b1, b2, b3, b4 . . . bm are the second target photosensitive values corresponding to the plurality of second target receiving points.

2. The method of positioning the laser pointer light source according to claim 1, wherein the obtaining the first target receiving point position information of the plurality of first target receiving points of the laser pointer light source at the first laser projection position of the display panel and the first target photosensitive values corresponding to the plurality of first target receiving points, and obtaining the second target receiving point position information of the plurality of second target receiving points of the laser pointer light source at the second laser projection position of the display panel and second target photosensitive values corresponding to the plurality of second target receiving points comprises:

obtaining first receiving point position information of a plurality of first receiving points of the laser pointer light source at the first laser projection position of the display panel and first photosensitive values corresponding to the plurality of first receiving points, and obtaining second receiving point position information of a plurality of second receiving points of the laser pointer light source at the second laser projection position of the display panel and second photosensitive values corresponding to the plurality of second receiving points; and     determining first target receiving point position information of at least a first group and a second group and first target photosensitive values corresponding to a plurality of first target receiving points of the first group and the second group according to the first receiving point position information and the first photosensitive values, and determining second target receiving point position information of at least a third group and a fourth group and second target photosensitive values corresponding to a plurality of second target receiving points of the third group and the fourth group according to the second receiving point position information and the second photosensitive values;

wherein a plurality of first target receiving points in a same group comprises at least two first target receiving points in a same row or in a same column, and are symmetrical about a first axis;

the plurality of first target receiving points in the first group are parallel to the plurality of first target receiving points in the second group;

a plurality of second target receiving points in a same group comprises at least two second target receiving points in a same row or in a same column, and are symmetrical about a second axis; and     the plurality of second target receiving points in the third group are parallel to the plurality of second target receiving points in the fourth group.

3. The method of positioning the laser pointer light source according to claim 2, wherein the obtaining the first photosensitive information of the first laser projection position of the laser pointer light source on the display panel and the second photosensitive information of the second laser projection position of the laser pointer light source on the display panel comprises:

determining the first photosensitive information at least according to the first target receiving point position information of the first group and the second group and an absolute value of a difference between the first target photosensitive values corresponding to the plurality of first target receiving points of the first group and the second group, and determining the second photosensitive information at least according to the second target receiving point position information of the third group and the fourth group and an absolute value of a difference between the second target photosensitive values corresponding to the second target receiving points of the third group and the fourth group.

4. The method of positioning the laser pointer light source according to claim 3, wherein the determining the target position information of the laser pointer light source according to the first position information, the second position information, the first photosensitive information, and/or the second photosensitive information comprises:

determining plane position information of the laser pointer light source in a first plane according to the first position information and the second position information;

determining a target vertical distance information between the laser pointer light source and the first plane according to the plane position information, the first position information, the first photosensitive information, and/or the plane position information, the second position information, and the second photosensitive information; and     determining the target position information according to the plane position information and the target vertical distance information; and     wherein the first plane is a plane where the first laser projection position and the second laser projection position are located.

5. The method of positioning the laser pointer light source according to claim 4, wherein when the first position information is (X1, Y1) and the second position information is (E2, F2), the plane position information of the laser pointer light source in the first plane is (X1, F2) or (E2, Y1).

6. The method of positioning the laser pointer light source according to claim 4, wherein the determining the target vertical distance information between the laser pointer light source and the first plane according to the plane position information, the first position information, the first photosensitive information, and/or the plane position information, the second position information, and the second photosensitive information comprises:

determining a first included angle information according to the first photosensitive information, and/or determining a second included angle information according to the second photosensitive information;

determining first vertical distance information between the laser pointer light source and the first plane according to the plane position information, the first position information, and the first included angle information, and/or determining second vertical distance information between the laser pointer light source and the first plane according to the plane position information, the second position information, and the second included angle information; and     determining the target vertical distance information according to the first vertical distance information and/or the second vertical distance information;

wherein the first included angle information is an angle value of a first included angle formed by a first optical path and the first plane when light of the laser pointer light source is projected to the first laser projection position; and     the second included angle information is an angle value of a second included angle formed by a second optical path and the first plane when light of the laser pointer light source is projected to the second laser projection position.

7. The method of positioning the laser pointer light source according to claim 4, wherein the first axis coincides with an orthographic projection of a first optical path in the first plane when light of the laser pointer light source is projected to the first laser projection position, and the second axis coincides with an orthographic projection of a second optical path in the first plane when the light of the laser pointer light source is projected to the second laser projection position.

8. The method of positioning the laser pointer light source according to claim 2, wherein an absolute value of a numerical difference between first target photosensitive values corresponding to two of the plurality of first target receiving points that are symmetric about the first axis in a same group is less than or equal to a first threshold; and an absolute value of a numerical difference between second target photosensitive values corresponding to two of the plurality of second target receiving points that are symmetric about the second axis in a same group is less than or equal to a second threshold.

9. A display device, comprising a first acquisition module, a second acquisition module, and a positioning module; wherein the first acquisition module is configured to obtain first position information of a first laser projection position of a laser pointer light source on a display panel and second position information of a second laser projection position of the laser pointer light source on the display panel;

the second acquisition module is configured to obtain first photosensitive information of the laser pointer light source at the first laser projection position of the display panel and second photosensitive information of the laser pointer light source at the second laser projection position of the display panel; and the positioning module is configured to determine target position information of the laser pointer light source according to the first position information, the second position information, the first photosensitive information, and/or the second photosensitive information;

wherein the first acquisition module comprises a first acquisition unit and a second acquisition unit, wherein:

the first acquisition unit is configured to obtain first target receiving point position information of a plurality of first target receiving points of the laser pointer light source at the first laser projection position of the display panel and first target photosensitive values respectively corresponding to the plurality of first target receiving points, and to obtain second target receiving point position information of a plurality of second target receiving points of the laser pointer light source at the second laser projection position of the display panel and second target photosensitive values respectively corresponding to the plurality of second target receiving points, wherein the first target receiving points and the second target receiving points are light sensors respectively arranged between pixels of the display panel, the first target receiving points are arranged between adjacent pixels of the display panel, and the second target receiving points are arranged between adjacent pixels of the display panel; and the second acquisition unit is configured to determine the first position information according to the first target receiving point position information and the first target photosensitive values, and to determine the second position information according to the second target receiving point position information and the second target photosensitive values, wherein the second acquisition unit comprises a first calculation subunit, the first calculation subunit is configured to perform a first weighted calculation and a second weighted calculation to determine the first position information according to the first target receiving point position information and the first target photosensitive values, and to perform a third weighted calculation and a fourth weighted calculation to determine the second position information according to the second target receiving point position information and the second target photosensitive values;

wherein a formula for the first weighted calculation is:

$$X1 = \frac{x1 \cdot a1 + x2 \cdot a2 + x3 \cdot a3 + x4 \cdot a4 + \ldots + xn \cdot an}{a1 + a2 + a3 + a4 + \ldots + an};$$

a formula for the second weighted calculation is:

$$Y1 = \frac{y1 \cdot a1 + y2 \cdot a2 + y3 \cdot a3 + y4 \cdot a4 + \ldots + yn \cdot an}{a1 + a2 + a3 + a4 + \ldots + an};$$

a formula for the third weighted calculation is:

$$E2 = \frac{e1 \cdot b1 + e2 \cdot b2 + e3 \cdot b3 + e4 \cdot b4 + \ldots + em \cdot bm}{b1 + b2 + b3 + b4 + \ldots + bm};$$

and
a formula for the fourth weighted calculation is:

$$F2 = \frac{f1 \cdot b1 + f2 \cdot b2 + f3 \cdot b3 + f4 \cdot b4 + \ldots + fm \cdot bm}{b1 + b2 + b3 + b4 + \ldots + bm},$$

where (X1, Y1) is the first position information, (x1, y1), (x2, y2), (x3, y3), (x4, y4) . . . (xn, yn) are the first target receiving point position information, a1, a2, a3, a4 . . . an are the first target photosensitive values corresponding to the plurality of first target receiving points; and (E2, F2) is the second position information, (e1, f1), (e2, f2), (e3, f3), (e4, f4) . . . (em, fm) are the second target receiving point position information, b1, b2, b3, b4 . . . bm are the second target photosensitive values corresponding to the plurality of second target receiving points.

10. The display device according to claim 9, wherein the first acquisition unit comprises a first acquisition subunit and a first target acquisition subunit;

the first acquisition subunit is configured to obtain first receiving point position information of a plurality of first receiving points of the laser pointer light source at the first laser projection position of the display panel and first photosensitive values corresponding to the plurality of first receiving points, and to obtain second receiving point position information of a plurality of second receiving points of the laser pointer light source at the second laser projection position of the display panel and second photosensitive values corresponding to the plurality of second receiving points; and the first target acquisition subunit is configured to determine first target receiving point position information of at least a first group and a second group and first target photosensitive values corresponding to a plurality of first target receiving points of the first group and the second group according to the first receiving point position information and the first photosensitive values, and to determine second target receiving point position information of at least a third group and a fourth group and second target photosensitive values corresponding to a plurality of second target receiving points of the third group and the fourth group according to the second receiving point position information and the second photosensitive values.

11. The display device according to claim 9, wherein the second acquisition module comprises a third acquisition unit, the third acquisition unit is configured to determine the first photosensitive information at least according to the first target receiving point position information of the first group and the second group and an absolute value of a difference between the first target photosensitive values corresponding to the plurality of first target receiving points of the first group and the second group, and to determine the second photosensitive information at least according to the second target receiving point position information of the third group and the fourth group and an absolute value of a difference between the second target photosensitive values corresponding to the plurality of second target receiving points of the third group and the fourth group.

12. The display device according to claim 11, wherein the third acquisition unit comprises a first distance acquisition subunit and a first absolute value acquisition subunit;
the first distance acquisition subunit is configured to determine a first distance according to the first target receiving point position information of the first group and the second group, and to determine a second distance according to the second target receiving point position information of the third group and the fourth group;
the first absolute value acquisition subunit is configured to determine a first absolute value of a difference between the first target photosensitive values corresponding to the plurality of first target receiving points of the first group and the second group according to the first target sensitive values corresponding to the plurality of first target receiving points of the first group and the second group, and to determine a second absolute value of a difference between the second target photosensitive values corresponding to the plurality of second target receiving points of the third group and the fourth group according to the second target sensitive values corresponding to the plurality of second target receiving points of the third group and the fourth group.

13. The display device according to claim 9, wherein the positioning module comprises a first positioning unit, a first calculation unit, and a second positioning unit;
the first positioning unit is configured to determine plane position information of the laser pointer light source in a first plane according to the first position information and the second position information;
the first plane is a plane where the first laser projection position and the second laser projection position are located;
the first calculation unit is configured to determine a target vertical distance information between the laser pointer light source and the first plane according to the plane position information, the first position information, the first photosensitive information, and/or the plane position information, the second position information, and the second photosensitive information; and
the second positioning unit is configured to determine the target position information according to the plane position information and the target vertical distance information.

14. The display device according to claim 13, wherein the first calculation unit comprises a second distance acquisition subunit, a second calculation subunit, and a third calculation subunit;
the second distance acquisition subunit is configured to obtain a third distance according to the plane position information and the first position information, and/or obtain a fourth distance according to the plane position information and the second position information;
the second calculation subunit is configured to obtain first vertical distance information according to the third distance and a first included angle information and/or to obtain second vertical distance information according to the fourth distance and a second included angle information; and
the third calculation subunit is configured to determine the target vertical distance information according to the first vertical distance information and/or the second vertical distance information.

15. The display device according to claim 9, further comprising a light sensor, a thin film transistor array configured to read data of the light sensor, and a reading circuit.

16. The display device according to claim 15, further comprising a memory, wherein the memory stores a plurality of instructions.

* * * * *